United States Patent [19]

Lembeck

[11] 4,194,697
[45] Mar. 25, 1980

[54] FOOD PROCESSOR AND AUXILIARY MIXING BOWL THEREFOR

[76] Inventor: William Lembeck, 54 Continental Ave., Forest Hills, N.Y. 11375

[21] Appl. No.: 5,333

[22] Filed: Jan. 22, 1979

[51] Int. Cl.² ............................................. B02C 18/16
[52] U.S. Cl. ..................................... 241/92; 222/352; 241/282.1; 366/314
[58] Field of Search ...................... 241/92, 277, 199.12, 241/282.1, 282.2; 366/205, 314; 222/352, 408, 410

[56] References Cited

U.S. PATENT DOCUMENTS

| | | | |
|---|---|---|---|
| 2,785,547 | 3/1957 | Barros | 241/282.1 X |
| 3,612,125 | 10/1971 | Krauth | 241/199.12 |
| 3,612,414 | 10/1971 | Nevison | 241/199.12 |
| 3,892,365 | 7/1975 | Verdun | 241/282.1 X |
| 4,113,188 | 9/1978 | Beunkoff | 241/92 X |

Primary Examiner—Howard N. Goldberg

[57] ABSTRACT

An inner auxiliary mixing bowl having an upwardly extending tubular post is removably nested within the outer mixing bowl of a food processor. The tubular post of the inner bowl is tapered with the upper, smaller end thereof being positioned closely about the uppermost end of the shaft and adjacent to the underside of the cutting tool that is driven by the motor of the food processor. Thus, the likelihood of the processed food passing between the inner surface of the tubular post and the outer surface of the driven shaft is minimized. This thereby reduces the likelihood of contamination of the interior of the motor by the processed food. The inner mixing bowl is made of a plastic material that permits it to be heated and frozen thereby vastly increasing its utility. In addition, a removable cover is provided for the inner mixing bowl so that the content thereof may be readily transported. The inner mixing bowl is preferably translucent and indicia are provided on the outside surface thereof for indicating the quantity of food within the bowl.

17 Claims, 4 Drawing Figures

FOOD PROCESSOR AND AUXILIARY MIXING BOWL THEREFOR

BACKGROUND OF THE INVENTION

The present invention pertains to food processors or the like and, in particular, to an auxiliary, inner mixing bowl therefor.

Food processors are well known in the art. Broadly speaking, they include a drive motor to which is attached a rotatable cutting tool. The food to be processed is fed to the cutting tool which can perform any one of a number of different functions. By way of example, the food may be chopped, ground, sliced or the like. The processed food is then received within a removable bowl that is mounted on the processor.

The prior art structures have, for the most part, been relatively efficient in their desired purpose. That is, the food is properly processed. However, with the prior art food processors there is a continuing problem of the processed food finding its way about the motor shaft and into the motor housing, thereby having a propensity to cause serious damage to what is probably the most expensive component of the apparatus. Moreover, with the prior art devices, when using the singularly provided mixing bowl, the same must be completely disassembled and cleaned prior to the next use thereof; especially when non-compatible foods, or foods which must be maintained separate and apart, are to be processed.

OBJECTS OF THE INVENTION

It is a primary object of the present invention to provide an improved food processor.

It is yet another object of the present invention to provide an improved food processor wherein an auxiliary, inner mixing bowl is removably positioned within the outer mixing bowl.

It is yet another object of the present invention to provide the inner mixing bowl described hereinabove with an elongated tubular central post that fits closely about at least a portion of the driven shaft of the cutting tool.

It is a further object of the present invention to provide an inner mixing bowl, as described above, wherein the tubular post terminates closely adjacent the underside of the cutting tool.

Yet another object of the present invention is to provide an improved auxiliary inner mixing bowl, as described above, wherein the post is tapered and has its smallest cross-section closely adjacent the driven shaft of the cutting tool, terminating proximate the underside of the cutting tool.

A particular object of the present invention is to provide an improved auxiliary bowl that may be nested within the main mixing bowl of a food processor.

An additional object of the present invention is to provide an improved auxiliary inner bowl for a food processor wherein the wall of the inner bowl is translucent and wherein indicia are provided on the sidewall of the bowl for indicating the quantity of processed food contained therein.

Yet another object of the present invention is to provide a cover for the auxiliary, inner bowl described hereinabove, the cover being adapted to be removably secured to the inner bowl by means of an annular groove formed on the underside of the cover.

A further object of the present invention is to provide an improved cover for the auxiliary inner bowl of a food processor wherein the cover has a recess for receiving the upper end of a central, tubular post of the inner bowl.

Yet a further object of the present invention is to provide an improved, auxiliary inner bowl that is made of a plastic material which can be both heated and cooled.

SUMMARY OF THE INVENTION

In accordance with one embodiment of the present invention, a food processor is provided which includes an electric motor having a drive shaft. A driven shaft is formed integrally with a cutting tool that includes a food processing blade portion and is coupled to the drive shaft for rotation concomitantly therewith. An outer bowl having a sidewall and a basewall with an opening therethrough is mounted over the motor, such that the drive shaft of the motor extends through the opening when the motor drive shaft is coupled to the driven shaft of the cutting tool. An inner auxiliary mixing bowl is removably nested within the outer bowl for receiving the food to be processed. The inner bowl includes a frusto-conical tubular post that is telescoped about the driving and the driven shafts that are coupled together and which supports the cutting tool.

In the present invention, the tubular, frusto-conical post of the inner, auxiliary bowl terminates in close proximity about the driven shaft and closely adjacent the underside of the cutting tool. Thus, as the food is processed and as it drops into the auxiliary bowl, there is little likelihood that any of the finely processed foods will pass outwardly of the inner cutting bowl and into the motor housing. This assures that there is little likelihood of damage to the motor caused by ingestion of the processed food. Moreover, the requirement of having to immediately disassemble the apparatus and clean the outer bowl is obviated.

The present invention is particularly effective because the central, tubular post thereof terminates in a plane that is substantially higher than the largest quantity of food that is likely to be processed. This assures that the processed food is kept away from any possible passageway that can lead to the internal portion of the motor or the immediate peripheral area of the drive and driven shafts.

Therefore, the present invention relates to a novel auxiliary bowl that is contained within the outer bowl of a food processor as well as a food processor containing an auxiliary inner bowl.

BRIEF DESCRIPTION OF THE DRAWINGS

The foregoing and other objects, features and advantages of the present invention will become readily apparent to those skilled in the art from the detailed description hereinafter, considered in conjunction with the accompanying drawings, wherein.

DETAILED DESCRIPTION OF THE PREFERRED EMBODIMENT

Figure 1:
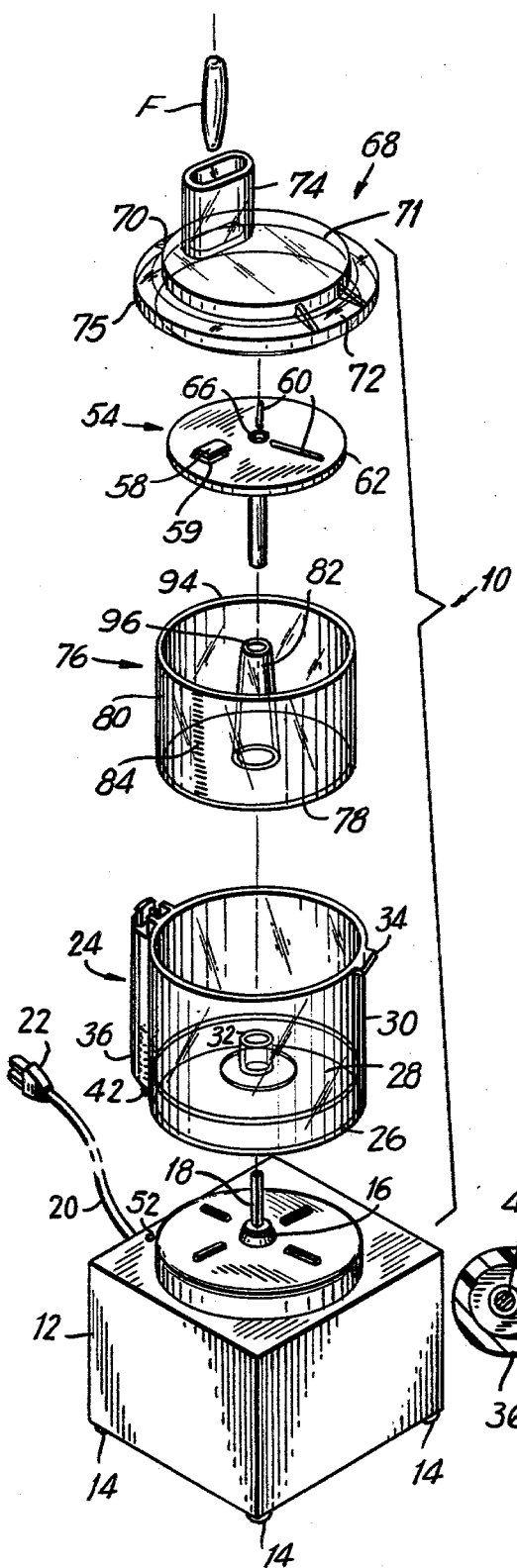
FIG. 1 is an exploded, perspective view illustrating the components comprising the present invention.
Figure 3:
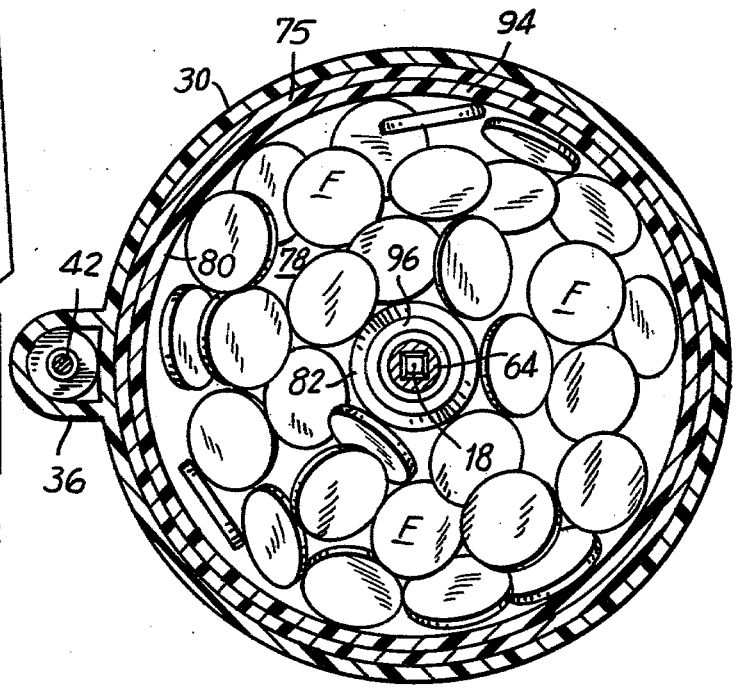
FIG. 3 is a sectional plan view taken along line 3—3 of FIG. 2.
Figure 2:
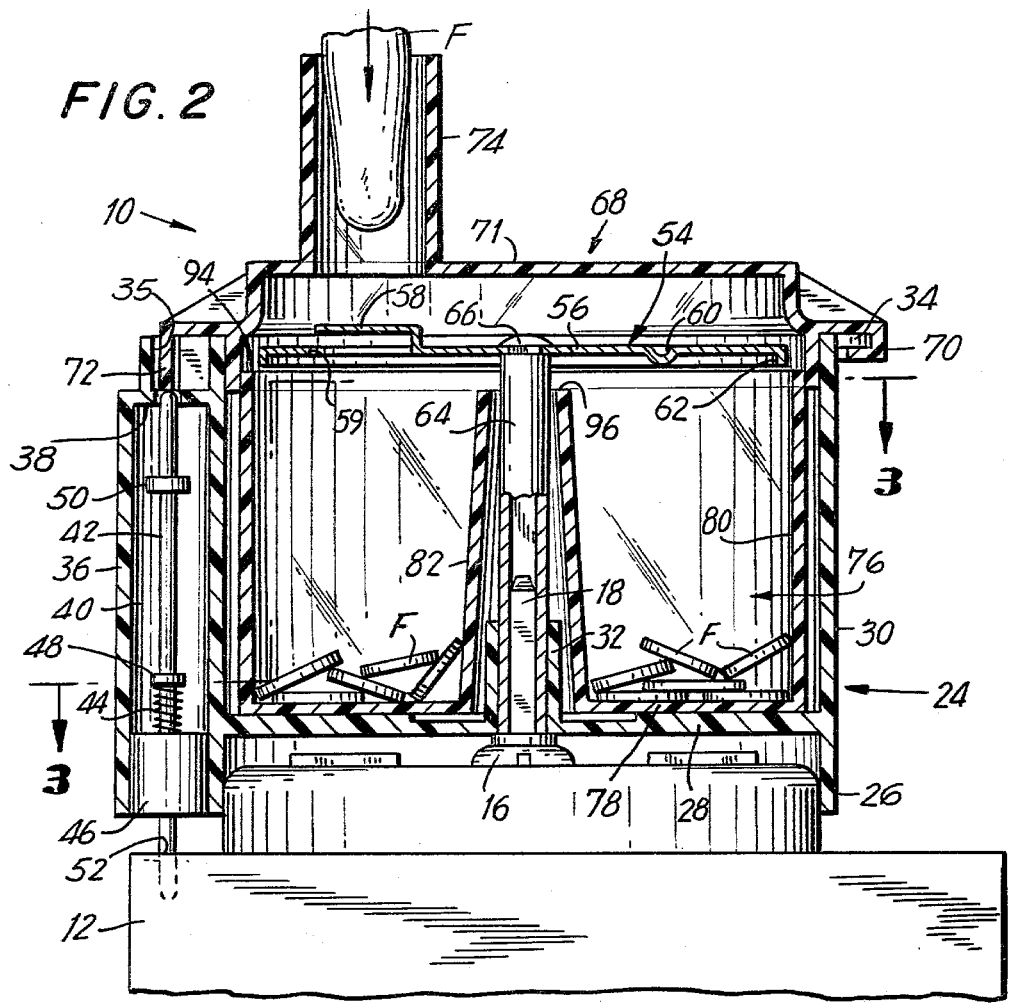
FIG. 2 is a fragmentary elevational view partially in section, of the components comprising the present invention in their assembled condition.

Referring now to the drawings, and in particular to FIGS. 1, 2 and 3, there is shown one embodiment of the present invention which comprises a novel food processor generally denoted by the reference numeral 10. The processor 10 is provided with a housing 12 having a plurality of feet 14 which serve the function of supporting the housing 12 on any suitable surface without marring the support surface. Within the housing 12 there is provided a motor 16 having an upwardly directed output shaft 18. A line cord 20 having a conventional male plug 22 is utilized for electrically energizing the motor 16 in a conventional manner.

An outer mixing bowl, generally designated by the reference numeral 24, is mounted relative to the housing 12 by means of a downwardly depending skirt 26. The outer mixing bowl 24 further includes a transverse basewall 28 and a sidewall 30 that extends upwardly therefrom in a direction opposite to the skirt 26. Internally of the outer mixing bowl 24, and at the center thereof, there is provided an upwardly extending post 32 which, as may be best seen in FIG. 2, is concentric with the axis of the upwardly extending drive shaft 18 of the motor 16.

At the upper end of the sidewall 30 of the mixing bowl 24, there is provided a localized and radially outwardly directed flange 34 whose function will be described hereinafter. Diametrically disposed from the flange 34 is a channel 35 defined by the combination of a wall 36 that is spaced radially outward from the sidewall 30 of the mixing bowl 24 and a transverse wall 38 that is integral with the upper end of the wall 36, as well as the sidewall 30. The vertical space 40 defined between the wall 36 and the wall 30 is occupied by an elongated plunger 42 that is biased to a normally upper position by means of a spring 44 that extends between a fixed block 46 and a flange 48 that is formed integrally with the plunger 42. A second flange 50 also formed integrally with the plunger 42 and axially spaced from the flange 48 bears against the underside of the transversal wall 38 and limits the upward movement of the plunger 42 in a manner to be described hereinafter. The lower end of the plunger 42 is arranged to engage a detent 52 formed on the top surface of the housing 12.

A cutting tool generally designated by the reference numeral 54 is coupled to the motor drive shaft 16 for rotation therewith. The cutting tool comprises a flat plate portion 56 having a blade 58 that is struck-out therefrom to define a processed food passage opening 59. A plurality of radially extending ribs 60 and a downwardly turned peripheral flange 62 serve as stiffening means for the cutting tool 54. A hollow post 64 is secured in a suitable manner to the plate 56, such as by a rivet 66 or the like. The post 64 is formed to fit within the upwardly extending post 32 of the outer mixing bowl 24 and is intended to internally receive the drive shaft 18 of the motor 16. In the embodiment illustrated, the motor drive shaft 18 has a square configuration. Thus, the internal configuration of the post 64 would similarly be of square cross-section. It should be readily apparent that other mating cross sections such as D-shaped or double D-shaped cross sections may be employed. In any event, the output shaft 18 of the motor 16 is the driving shaft and the shaft 64 is the driven shaft.

The outer mixing bowl 24 is both closed and locked in place by means of a cover that is generally designated by the reference numeral 68. A downwardly and inwardly extending flange 70 is provided on one side of the top wall 71 of the cover 68 for the purpose of releasably engaging the flange 34 which is formed integrally with the upper end of the sidewall 30 of the outer mixing bowl 24. Diametrically disposed from the flange 70 there is provided a locking cam 72 that is arranged to angularly enter the space 35 so as to engage and depress the plunger 42 when the cover 68 is rotated into the position shown in FIG. 2. In this manner, the food processor will be substantially closed except for the provision of an input channel 74 which extends through the top wall 71 and which is arranged to receive a mass of food F such as is shown in both FIGS. 1 and 2. For purposes to be described later, a peripheral lip 75 extends downwardly from the top wall 71 and is positioned proximate the inside surface of the wall 30 of the outer mixing bowl 24.

Normal operation of a food processor without the provision of the present invention will result in food accumulating within the outer mixing bowl 24. Since the post 32 is relatively short, it is quite likely that the food that is processed will accumulate to a height above the top of the post 32. This will permit food particles to travel downwardly along the outside surface of the driven shaft 64 so as to ultimately enter the housing of the motor 16. It will be appreciated that continued operation may well result in an accumulation of contaminants within the motor housing and will ultimately lead to failure of the motor 16. In any event, cleaning of this area is requisite prior to subsequent use of the processor. The present invention clearly overcomes this problem that is inherent in prior art food processors by the provision of an inner, auxiliary mixing bowl 76, which will now be described.

Figure 4:
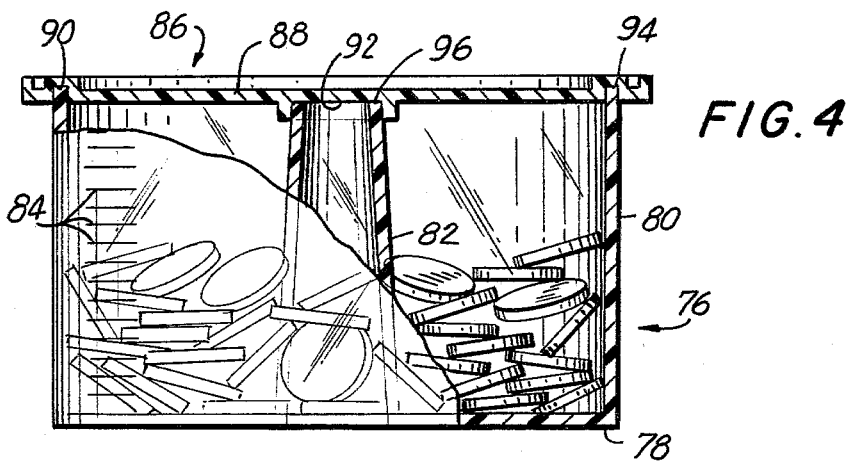
FIG. 4 is an elevational view partially in section illustrating the auxiliary, inner mixing bowl comprising the present invention.

As shown, for example, in FIG. 4, the inner auxiliary mixing bowl 76 comprises a base wall 78 and a peripheral side wall 80 extending upwardly therefrom. There is also provided a central, frusto-conical tubular post 82 that is concentrically located with respect to the sidewall 80. It is contemplated that the inner mixing bowl 76 be made of a high temperature-resistant plastic material such as polyethylene terathalate, polycarbonate, polymethyl pentene, polysulfone or the like. It is desirable that at least the sidewall 80 be translucent so that the contents therein may be visually observed. In this regard, indicia 84 are provided on the sidewall 80 to show the amount of processed food contained in bowl 76.

As also shown in FIG. 4, there may also be provided a cover 86 which is comprised of a transverse wall 88, an annular downwardly facing groove 90 which is proximate the periphery of the transverse wall 88 and a centrally oriented, downwardly directed recess 92. The annular groove 90 is intended to receive the upper end 94 of the sidewall 80, while the centrally located recess 92 is intended to receive the upper end 96 of the central post 82. As shown in FIG. 2, the upper end 94 of the sidewall 80 is positioned proximate the inside surface of the lip 75 formed on the cover 68.

It will be evident from the foregoing that a new and improved food processor as well as a new and improved auxiliary mixing bowl therefor has been provided. In combination, the inner mixing bowl described hereinabove, prevents the processed food from entering either the main mixing bowl or the motor housing. The inner bowl is provided with an elongated, centrally located frusto-conical post that surrounds the cutting tool driven shaft and terminates proximate the underside of the cutting tool. Thus, the processed food that accumulates in the inner mixing bowl is unlikely to reach the level of the upper end of the post of the inner bowl and in this manner contamination by food particles of the motor housing area is prevented. The auxiliary inner bowl comprising the present invention is made of a plastic material that may be both heated and frozen. Thus, substantially greater utility is provided. The cover that may form a portion of the auxiliary, inner bowl permits safe and convenient transfer thereof without deterioration of the contents of the bowl.

While specific locking means have been shown for retaining the outer bowl in a fixed position relative to the motor housing and while specific coupling means have been shown for drivingly engaging the motor output shaft to the driven cutting tool shaft, it will be readily apparent that similar structures may be employed. For example, a key and keyway arrangement may be used for coupling the driving and driven shafts, or, alternatively, a D or double D shape may be used. Other clamping means that are separate and distinct from the cover may be utilized for attaching the outer mixing bowl to the motor housing.

The essence of the invention, however, remains in the provision of an inner, auxiliary mixing bowl having a frusto-conical center post that surrounds the coupled driving and driven shafts and which terminates at its upper end proximate the underside of the cutting tool and the outer surface of the driven shaft in order to prevent contamination of the interior of the motor or the motor drive shaft area by the processed food, and obviate the necessity of continual cleaning of the outer mixing bowl.

While I have shown and described the preferred embodiment of the present invention, it will be appreciated that the teachings herein will readily lend itself to many modifications, changes, combinations and improvements by those skilled in the art, without deviating from the present invention or the teachings hereof.

What is claimed is:

1. A food processor comprising, in combination:
   an electric motor having a drive shaft,
   cutting tool means including a food processing blade portion having an integrally formed driven shaft,
   said driven shaft being coupled to said drive shaft for rotation therewith,
   an outer bowl having a basewall including an opening through which said drive shaft extends and a side wall extending upwardly from said basewall,
   an inner bowl removably nested within said outer bowl for receiving therein the food to be processed by said blade portion,
   said inner bowl including a sidewall and a basewall having a tubular post,
   at least a portion of said tubular post being positioned in close proximity about said driven shaft of said cutting tool means and terminating adjacent the underside of said cutting tool means to thereby minimize the passage of processed food through said opening in said basewall of said outer bowl, whereby said motor is not contaminated by said processed food, and
   cover means removably coupled to said outer bowl.

2. A food processor in accordance with claim 1, wherein said post has a frusto-conical configuration which has the smallest cross-section thereof disposed at its upper end.

3. A food processor is accordance with claim 1, wherein said inner bowl is translucent.

4. A food processor in accordance with claim 1, wherein
   said inner bowl includes indicia on said sidewall, and
   said indicia being capable of indicating the quantity of processed food within said inner bowl.

5. A food processor in accordance with claim 1, wherein
   said cover means includes a downwardly extending peripheral rim positioned proximate the inside surface of said outer bowl, and
   the outside surface of said sidewall of said inner bowl is positioned proximate the inside surface of said peripheral rim.

6. A food processor in accordance with claim 1, wherein said basewall of said inner bowl is seated on the upper surface of said basewall of said outer bowl.

7. A food processor in accordance with claim 1, including a cover capable of removable securement to said inner bowl.

8. A food processor according to claim 7, wherein said cover means includes an annular groove for receiving the upper end of said inner bowl.

9. A food processor in accordance with claim 7, wherein said cover means includes a recess for receiving the upper end of said post.

10. In a food processor including an electric motor having a drive shaft, a cutting tool including a food processing blade and a driven shaft that is integral therewith and which is coupled to the drive shaft for rotation therewith, an outer bowl having a basewall that includes an opening through which said drive shaft extends and a sidewall extending upwardly from the basewall and cover means removably coupled to the outer bowl, the improvement comprising
    an inner bowl removably nested within the outer bowl for receiving therein the food to be processed by the blade portion,
    said inner bowl including a sidewall and a basewall having a tubular post extending upwardly therefrom,
    at least a portion of said tubular post being positioned in close proximity about the driven shaft and adjacent the underside of the cutting tool to thereby minimize the passage of processed food through the opening in the basewall of the outer bowl, whereby the motor is not contaminated by said processed food.

11. The improvement in accordance with claim 10, wherein said post has a frusto-conical configuration which has the smallest cross-section thereof disposed at its upper end.

12. The improvement in accordance with claim 10, wherein said inner bowl is translucent.

13. The improvement in accordance with claim 10, wherein
    said inner bowl includes indicia on said sidewall, and
    said indicia being capable of indicating the quantity of processed food disposed within said inner bowl.

14. The improvement in accordance with claim 10, wherein said basewall of said inner bowl is seated on the upper surface of said basewall of the outer bowl.

15. The improvement in accordance with claim 10, including cover means capable of removable securement to said inner bowl.

16. The improvement in accordance with claim 15, wherein said cover means includes an annular groove for receiving the upper end of said inner bowl.

17. The improvement in accordance with claim 15, wherein said cover means includes a recess for receiving the upper end of said post.

* * * * *